United States Patent

[11] 3,584,205

[72] Inventors Davey Malaby
Rochester, Minn.;
Michael A. Wesley, Somers, N.Y.
[21] Appl. No. 767,236
[22] Filed Oct. 14, 1968
[45] Patented June 8, 1971
[73] Assignee International Business Machines Corporation
Armonk, N.Y.

[54] BINARY ARITHMETIC AND LOGIC MANIPULATOR

8 Claims, 13 Drawing Figs.

[52] U.S. Cl. .......... 235/152, 235/156, 235/175, 328/92
[51] Int. Cl. .......... G06f 7/38
[50] Field of Search .......... 235/152, 156, 175, 176; 340/166, 146.2, 172.5; 328/158, 92

[56] References Cited

UNITED STATES PATENTS

| | | | |
|---|---|---|---|
| 3,261,000 | 7/1966 | Behnke | 340/146.2X |
| 3,371,320 | 2/1968 | Lachenmayer | 340/166X |
| 3,454,310 | 7/1969 | Wilhelm, Jr. | 235/152X |

OTHER REFERENCES

J. C. Greeson, Jr., " Variable Function Logic Block," IBM TECHNICAL DISCLOSURE BULLETIN, Vol. 11, No. 3, August 1968

*Primary Examiner*—Malcolm A. Morrison
*Assistant Examiner*—Charles E. Atkinson
*Attorneys*—Hanifin and Jancin and Isidore Match

ABSTRACT: A programmable binary arithmetic and logic manipulator which comprises a rectangular array of (M) (N+1) logic cells and N+1 columnar control cells. The columnar control cells are designated as U and V and are binary stages capable of assuming binary one or binary zero states. These columnar control cells control the overall operation performed by each column. Associated with each cell are a pair of binary stages designated X and Y respectively, which in conjunction with the columnar control cells U and V define the outputs D and E of a cell as functions of the cell inputs A, B and C. The output lines D and E of each cell are used as inputs to adjacent cells or, at the edges of the array, as inputs to external logic or additional arrays. Each column can be selected by a storage position U as an arithmetic or logical operation. In addition, each column can be selected by a storage position V as (1) their AND and OR function when used with U as a logical operation or (2) as a binary input to the column when used with U as an arithmetic operation. Input C may be connected externally to input B or may instead be connected externally to another array or to external logic. Each logical cell contains a circuit whereby the logic statements for each output line are as follows:

$$D=\bar{X}(YC+\bar{Y}B)+X[\bar{U}A+UC(YB+\bar{Y}\bar{B})]$$
$$E=\bar{X}(YB+\bar{Y}C)+X\{[\bar{U}\bar{V}+\bar{U}C+U\bar{C})(YB+\bar{Y}\bar{B})]+ +[UC(\bar{Y}B+Y\bar{B})]+[\bar{U}\bar{V}C]\}$$

INVENTORS
DAVEY L. MALABY
MICHAEL A. WESLEY
BY Isidore Match
ATTORNEY

FOR X = O
(DONT CARE)

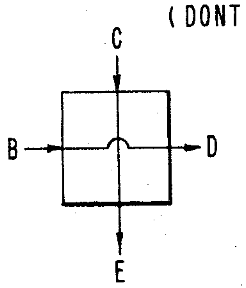

Y = O
(PASS)

FIG. 3

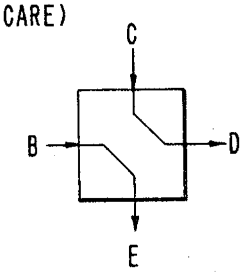

Y = 1
(TRANSFER)

FIG. 4

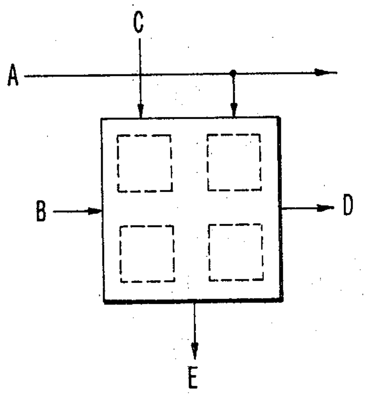

FIG. 5

| | U=O (LOGICAL) V=O (OR) | U=O (LOGICAL) V=1 (AND) | U=1 (ARITHMETIC) V=O (BINARY 0) | U=1 (ARITHMETIC) V=1 (BINARY 1) |
|---|---|---|---|---|
| (DONT CARE) X=O — (PASS) Y=O | D=B<br>E=C | D=B<br>E=C | D=B<br>E=C | D=B<br>E=C |
| (DONT CARE) X=O — (TRANSFER) Y=1 | D=C<br>E=B | D=C<br>E=B | D=C<br>E=B | D=C<br>E=B |
| (CARE) X=1 — (COMPLEMENT) Y=O | D=A<br>E=$\bar{B}$+C | D=A<br>E=$\bar{B}$·C | D=$\bar{B}$·C<br>E=($\bar{B}$·$\bar{C}$)+(B·C) | D=$\bar{B}$·C<br>E=($\bar{B}$·$\bar{C}$)+(B·C) |
| (CARE) X=1 — (TRUE) Y=1 | D=A<br>E=B+C | D=A<br>E=B·C | D=B·C<br>E=(B·$\bar{C}$)+($\bar{B}$·C) | D=B·C<br>E=(B·$\bar{C}$)+($\bar{B}$·C) |

FIG. 6

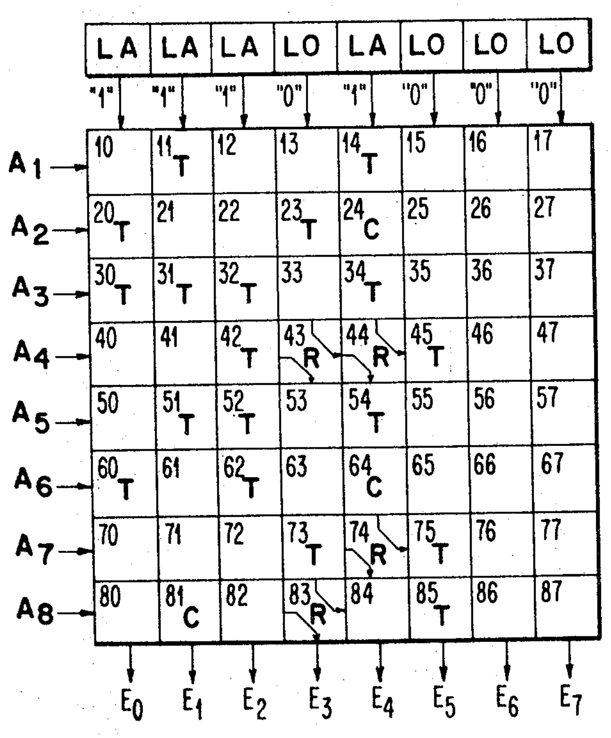

FIG. 7

LO = LOGICAL OR
LA = LOGICAL AND
AO = ARITHMETIC 0 INPUT
A1 = ARITHMETIC 1 INPUT
T = TRUE CARE
C = COMPLEMENT CARE
R = TRANSFER
BLANK = PASS $E_0 = A_2 \cdot A_3 \cdot A_6$ $E_1 = A_1 \cdot A_3 \cdot A_5 \cdot \bar{A}_8$ $E_2 = A_3 \cdot A_4 \cdot A_5 \cdot A_6$ $E_5 = (A_1 \cdot \bar{A}_2 \cdot A_3) + (A_2 \cdot A_5 \cdot \bar{A}_6) + A_4 + A_7$

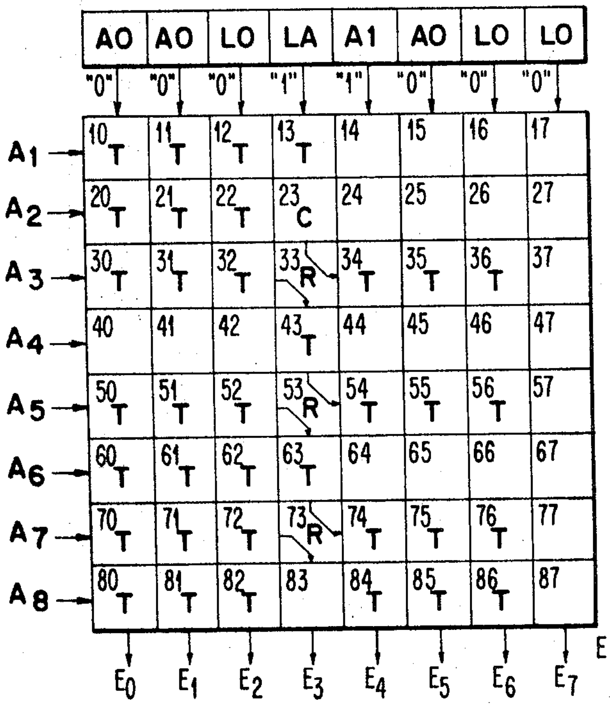

FIG. 8A

LO = LOGICAL OR
LA = LOGICAL AND
AO = ARITHMETIC 0 INPUT
A1 = ARITHMETIC 1 INPUT
T = TRUE CARE
C = COMPLEMENT CARE
R = TRANSFER
BLANK = PASS $E_0(1), E_1(2), E_2(4) = \Sigma(A_1, A_2, A_3, A_5, A_6, A_7, A_8)$ $E_6 = [(A_1 \cdot \bar{A}_2), (A_3 \cdot A_4), (A_5 \cdot A_6), A_8]_4^3$

BINARY ARITHMETIC AND LOGIC MANIPULATOR

BACKGROUND OF THE INVENTION

This invention relates to an arithmetic and logic manipulator. More particularly, it relates to an arrangement wherein there tend to be combined logical and arithmetic operations in the same array. Many of the known character and pattern recognition systems in existence today operate by transforming the character or pattern to be recognized into a string of binary bits for subsequent digital processing. In such digital processing, many of the recognition algorithms employed therein involve a data reduction operation which results in the production of a string of binary bits which indicates the presence or absence of subpatterns or features in the original pattern or character.

Pattern or character classification is quite often based upon the computation of the Hamming distances between the string of bits which indicate the features which are present and a library of standard feature strings of bits which represent the standard classifications. Particularly, standard feature strings may be in ternary form thereby allowing a "Don't Care" condition for features not relevant to a particular standard classification.

It is accordingly an important object of this invention to provide an arrangement which assists in both the detection of features and in the comparison of features present with the library of standard features.

It is another object to provide an arrangement which, when used for the foregoing feature detection, may be programmed to compute in parallel multilevel Boolean or majority, i.e., threshold, functions between bits in the string representing the original pattern or character.

It is a further object to provide an arrangement which when used for comparison with the library of standard references may be programmed to compute in parallel the Hamming distances between the bit strings representing the features present and a library of standard references in ternary form.

It is yet another object of the invention to provide a binary arithmetic and logic manipulator which is capable of combining both arithmetic and logical operations.

SUMMARY OF THE INVENTION

Generally speaking, and in accordance with the invention, there is provided a programmable logic and arithmetic manipulating arrangement. The arrangement comprises a rectangular array of cells which define N+1 columns of the cells and M rows of the cells, the output D of each cell in a row being applied as an input B to the next cell to the right in the row, the output E of each cell in a column being applied as an input C to the next lower cell in the column. Included in the arrangement are a first storage stage U and a second storage stage V associated with each of the columns for determining the operation to be performed by each column, the U and V stages each being capable of assuming opposite binary states, and a third storage stage X and a fourth storage stage Y associated with each of the cells for determining the operations to be performed by each of the cells in accordance with the operation determined by the aforementioned U and V stages, the X and Y stages each being capable of assuming opposite binary states. There are provided means for applying respective $B_1$—$B_M$ inputs to each of the cells in the leftmost column of the array; means for applying $A_1$—$A_M$ inputs to the cells respectively comprising each row in the array; and means for applying respective $C_O$—$C_N$ inputs to each of the cells in the topmost row of the array. The array is operative to produce respective $D_1$—$D_M$ outputs from the cells comprising the rightmost column of the array and $E_0$—$E_N$ respective outputs from the cells comprising the lowermost column of the array, the cells each comprising a circuit for producing the following D and E outputs:

$$D=\overline{X}(YC+\overline{Y}B)+X[\overline{U}A+UC(YB+\overline{Y}\overline{B})]$$

$$E=\overline{X}(YB+\overline{Y}C)+X\{[\overline{U}\overline{V}+\overline{U}C+U\overline{C})(YB+\overline{Y}\overline{B})]+[UC(\overline{Y}B+Y\overline{B})]+[\overline{U}\overline{V}C]\}$$

The foregoing and other objects, features and advantages of the invention will be apparent from the following more particular description of a preferred embodiment of the invention, as illustrated in the accompanying drawings.

BRIEF DESCRIPTION OF THE DRAWINGS

In the drawings:

FIG. 3 is a diagram of the "pass" operation;

FIG. 4 is a diagram similar to FIG. 3 of the "transfer" operation;

FIG. 5 is a depiction illustrating the functional unit according to the invention;

FIG. 6 is a truth table of the functions produced by the logic cell of the invention;

FIG. 7 is a diagram illustrating the operation of the invention as a logic manipulator;

FIGS. 8A and 8B are diagrams illustrating the operation of the invention as a combined binary arithmetic and logic manipulator;

DESCRIPTION OF THE PREFERRED EMBODIMENT

Figure 1:
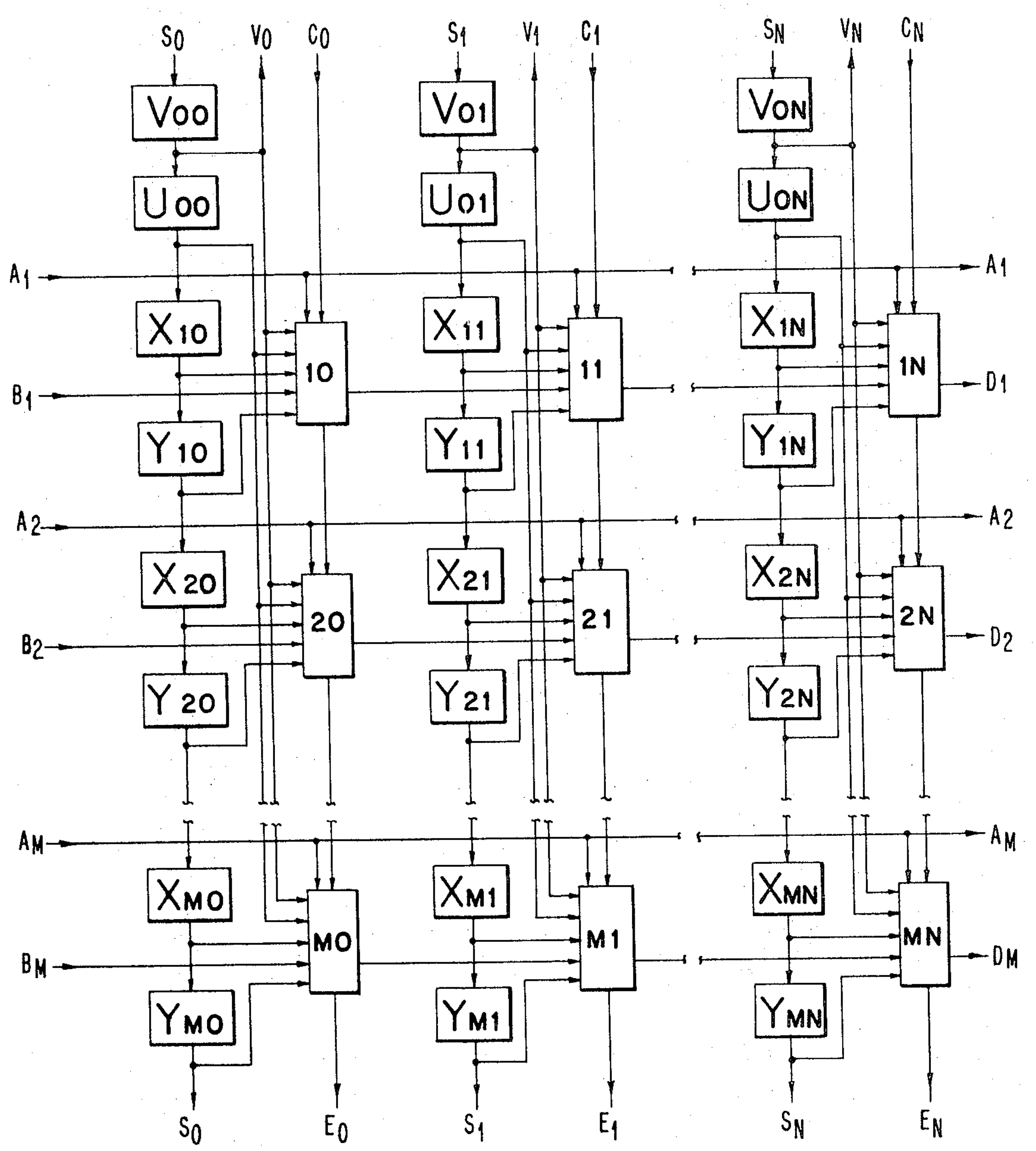
FIG. 1 is a depiction of an illustrative embodiment of an arithmetic and logic manipulator constructed in accordance with the principles of the invention.

Referring to FIG. 1, there is shown therein a depiction of an arrangement constructed in accordance with the principles of the invention. The arrangement comprises a rectangular grid of logic cells which are designated with two digit numerals, the first digit designates the row in which a cell falls and the second digit designates the column in which a cell is located. Thus, the cells constituting the topmost row of the grid are designated with the numerals 10—1N respectively. The cells constituting the leftmost column of the grid are designated with the numerals 10—MO respectively. The grid accordingly comprises (M)(N+1) cells.

Associated with each column are a pair of storage positions, viz. U and V, which control the overall operation performed by each column. As seen in FIG. 1, the V storage positions are designated as $Y_{00}$—$V_{ON}$ and the U storage positions are designated $U_{00}$—$U_{ON}$, i.e., there are a pair of U and V storage position controls provided for each column. The outputs of the V and U storage position stages are respectively applied to each of the logic cells in the corresponding column. It will be further explained hereinbelow how the U and V storage positions control the overall operation performed by each column.

A pair of storage position controls X and Y are provided for each cell. Thus, for example, for the topmost row of logic cells 10—1N, the associated X position stages are respectively designated $X_{10}$—$X_{1N}$ and the Y position stages are respectively designated $Y_{10}$—$Y_{IN}$. Consequently, in the M row, in the N column, the X and Y cells are designated $X_{MN}$ and $Y_{MN}$.

Each cell has three inputs, viz. A, B, and C. At the edges of the array, the A and B inputs are designated by subscripts in accordance with the row to which they are applied. Thus, for example, the inputs to the topmost row are $A_1$ and $B_1$. The A and B inputs to the lowermost row are $A_M$ and $B_M$. The C inputs are applied only to the logic cells of the topmost row thereof and are respectively designated as $C_O$—$C_N$.

The horizontal output of each cell is its D output and the vertical output of each cell is its E output. As seen in the depiction in FIG. 1, the D output line of a cell is effectively the B input line to the adjacent cell to the right in a row. The E output line of a cell is the C input line to the next lower cell. The D output lines from the N column of cells are designated $D_1$—$D_M$. The E output lines of the cells in the M row are designated $E_O$—$E_N$ respectively. Into each stage V, there is shown an input S, i.e., a shift register input, the S inputs being designated $S_0$—$S_N$ and function to act as shifting pulses if it is chosen to have the U, V, X and Y stages in a shift register. The outputs of each V unit are shown as being applied to the U units and thence to each X and Y unit in series, such connection being made to indicate a shift register construction.

As will be explained further hereinbelow, the X and Y stages are storage positions within each cell that, in conjunction with the column control cells U and V, define the outputs D and E of a cell as functions of the cell inputs A, B and C. The output lines D and E of each cell are used as inputs to adjacent cells or, at the edges of the grid, as inputs to external logic or additional grids.

Each column can be selected by its associated storage position U to perform an arithmetic or a logical operation. In addition, each column can be selected by its associated storage position V to perform an AND or OR function when the associated U storage position is employed to select a logical operation for the column or, as a binary input to the column when the associated storage position U is used to select an arithmetic operation for the column. The storage positions X and Y are used as separate controls on each individual cell. Storage position X is considered as a CARE/DON'T CARE control and storage position Y as a TRUE/COMPLEMENT control. The X and Y positions are used in conjunction with each other as follows:

Where X is employed as a CARE control, i.e., condition X, Y selects the TRUE input B, i.e., condition YB, or the COMPLEMENT of input B, i.e., condition $Y\bar{B}$;

where X is employed as a DON'T CARE control, i.e., condition $\bar{X}$, Y selects the bypass paths referred to as PASS and TRANSFER of the inputs B and C, i.e., the conditions UC, YB, $\bar{Y}B$ and $\bar{Y}C$.

The structure of each cell 10—MN enables the following outputs on the D and E output lines respectively.

$$D=\bar{X}(YC+\bar{Y}B)+X[\bar{U}A+UC(YB+\bar{Y}\bar{B})]$$

$$E=\bar{X}(YB+\bar{Y}C)+X\{[(\bar{U}\bar{V}+\bar{U}C+U\bar{C})(YB+\bar{Y}\bar{B})]+[UC(\bar{Y}B+Y\bar{B})]+[\bar{U}\bar{V}C]\}$$

Figure 2A:
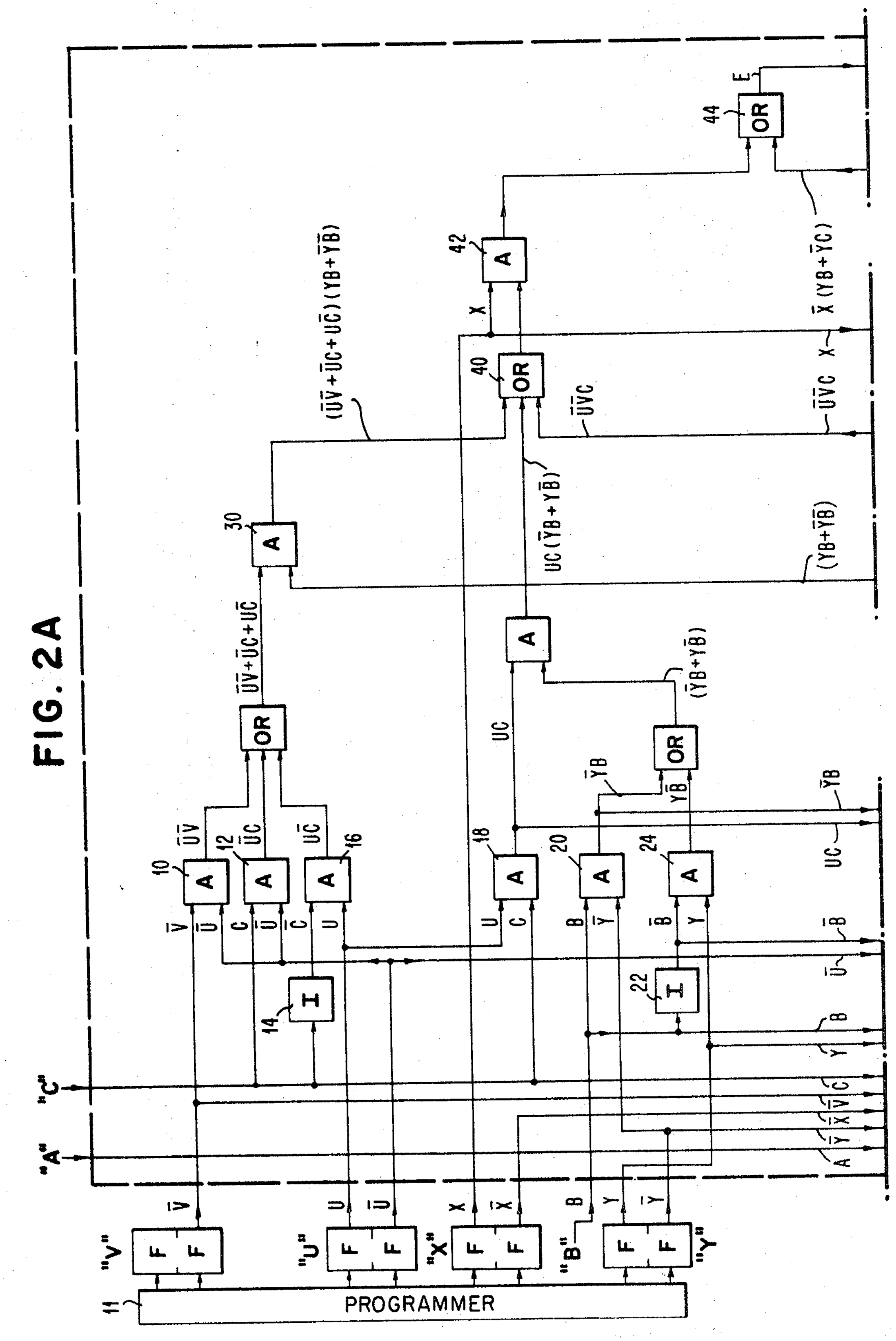
FIGS. 2A and 2B, taken together as in FIG. 2, constitute a logical diagram of an embodiment of a logic cell shown in FIG. 1.
Figures 2, 2B:
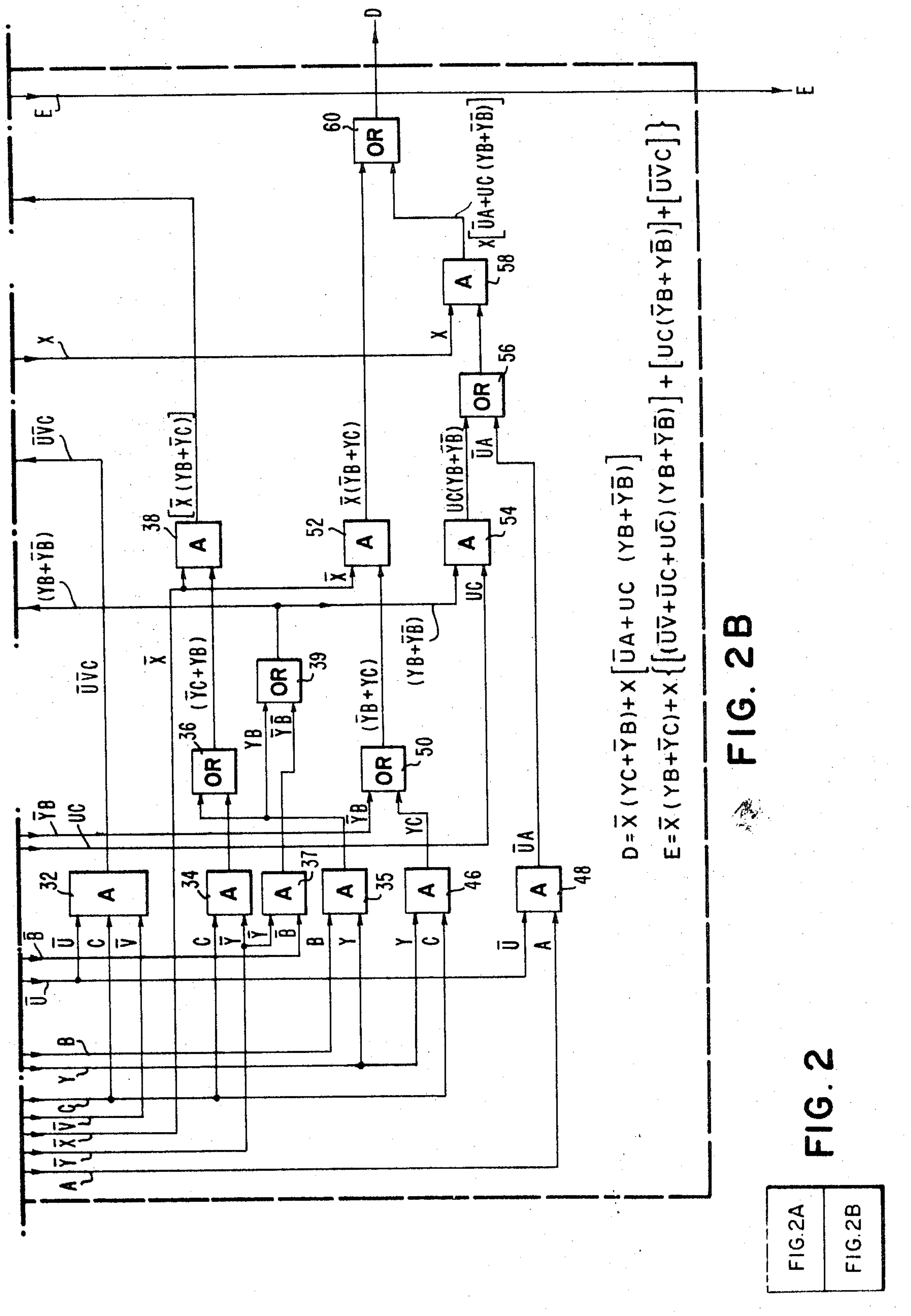

In FIGS. 2, 2A and 2B, there is shown an illustrative embodiment of an arrangement for each cell 10—MN for producing the foregoing equations on output lines D and E respectively. In these FIGS., it is seen that the V, U, X and Y stages are external to the structure of a logic cell, the U, V, X and Y stages being externally programmed. They are shown in FIGS. 2, 2A and 2B as being bistable circuits such as flip-flops which are programmed for given operations. One method of program storage and load could be as shown in FIG. 1 where U, V, X and Y may be positions of a shift register which is columnar loaded with the S input being the shift input. The number of columns loaded in parallel would depend on the word size of the memory or processor employed to load the array. This type of approach generally assumes that the program would be changed infrequently compared to its control of a variety of inputs. Where more dynamic program changes are needed, each cell could have temporary shift register positions where the total storage array including the temporary positions could be loaded infrequently from an external device. Alternatively, a shift signal could load a different program from temporary storage where all positions would change simultaneously. The storage array could be an addressable memory which would give it considerable flexibility.

Another method of program storage and load could be to make each storage position U, V, X, and Y be controlled by a light sensitive diode or transistor and to package the array so that a changeable mask and constant light source would produce the required program.

The structure contained within the area enclosed by the broken lines in FIGS. 2, 2A and 2B is the circuitry within the logic cell. As seen therein, the AND circuit 10 produces the output $\bar{U}\bar{V}$ and the AND circuit 12 produces the output $\bar{U}C$. The inverter 14 produces the output $\bar{C}$ and the AND circuit 16 produces the output $U\bar{C}$. The OR circuit 18 produces the output $(\bar{U}\bar{V}+\bar{U}C+U\bar{C})$. The AND circuit 18 produces the output UC and the AND circuit 20 produces the output $\bar{Y}B$. The inverter 22 produces the output $\bar{B}$. The AND circuit 24 produces the output $Y\bar{B}$ and the OR circuit 26 produces the output $(\bar{Y}B+Y\bar{B})$ whereby the AND circuit 28 produces the output $UC(\bar{Y}B+Y\bar{B})$. The AND circuit 32 produces the output $\bar{U}\bar{V}C$, the AND circuit 34 produces the output $\bar{Y}C$, and the AND circuit 35 produces the output YB whereby the OR circuit 36 produces the output $(YB+\bar{Y}C)$ and the AND circuit 38 produces the output $\bar{X}(YB+\bar{Y}C)$. The AND circuit 37 produces the output $\bar{Y}\bar{B}$ and the OR circuit 39 produces the output $YB+\bar{Y}\bar{B}$ whereby the AND circuit 30 produces the output $(\bar{U}\bar{V}+\bar{U}C+U\bar{C})(YB+\bar{Y}\bar{B})$, the output of OR circuit 40 being $(\bar{U}\bar{V}+\bar{U}C+U\bar{C})(YB+\bar{Y}\bar{B})+UC(\bar{Y}B+Y\bar{B})+\bar{U}\bar{V}C$ whereby with the input of X to the AND circuit 42, the output of OR circuit 44 is the equation for the output on an E line.

The AND circuit 46 produces the output YC and the AND circuit 48 produces the output $\bar{U}A$ whereby the OR circuit 50 produces the output $(\bar{Y}B+YC)$ and the AND circuit 52, having the input $\bar{X}$ applied thereto, produces the output $\bar{X}(YC+\bar{Y}B)$. The AND circuit 54 produces the output $UC(YB+\bar{Y}\bar{B})$ whereby the OR circuit 56 produces the output $\bar{U}A+UC(YB+\bar{Y}\bar{B})$. The AND circuit 58 produces the output $X[\bar{U}A+UC(YB+\bar{Y}\bar{B})]$ and the OR circuit 60 produces an output having the equation appearing on an output line D.

FIGS. 3 and 4 respectively show the operation when X is in its DON'T CARE state, i.e., condition $\bar{X}$, for the condition $\bar{Y}$, i.e., the "pass" condition, and the condition Y, i.e., the "transfer" condition. It is seen that in the pass condition (FIG. 3), the input B appears directly on output line D and the input C appears on the output line E. In the transfer condition (FIG. 4), the input C is transferred to output line D and the input B is transferred to the output line E. The pass operations are effected by the terms $\bar{X}\bar{Y}B$ and $\bar{X}\bar{Y}C$. The transfer operations are effected by the terms $\bar{X}YC$ and $\bar{X}YB$. In FIG. 5, there is shown a diagram which illustrates the functional unit where U, V, X, and Y, are storage positions that control the logical input lines A, B, and C, in order to generate the outputs on lines D and E.

FIG. 6 is a truth table setting forth the logical function performed in each cell 10—MN by the columnar controls U and V, the cell controls X and Y, and the input lines A, B and C. In this table it is seen that when U is at binary "1," i.e., the condition U, an arithmetic operation is performed. With U calling for an arithmetic operation and V equal to binary "1," i.e., condition UV, a binary "1" is added to a column. With V equal to a binary "0" in this situation, i.e., condition $U\bar{V}$, a binary "0" is added to a column. Where U is equal to "0," i.e., condition $\bar{U}$, and with V equal to a binary "1," i.e., condition $\bar{U}V$, an AND operation is performed by a column and with condition $\bar{U}\bar{V}$, i.e., where V is also a binary "0," an OR operation is performed by a column. In the horizontal aspect in the $\bar{X}$ condition, i.e., $\bar{X}$ is performing a DON'T CARE operation, $\bar{X}Y$ calls for a transfer operation and $\bar{X}\bar{Y}$ calls for a pass operation. With X in the binary "1" state, i.e., calling for a CARE operation, the condition XY calls for the selection of the TRUE B input and the condition XY calls for the complement of the B input.

In FIG. 7, there is shown an illustration of an array constructed in accordance with the invention wherein only a logical operation is performed. The array is selected to comprise a grid of eight by eight logical cells to constitute eight columns and eight rows. The $A_1$ to $A_8$ inputs are the inputs to each row of cells, it being assumed that the B inputs of the first column are tied to the A inputs and are therefore not shown. The eight columns are designated 0—7 whereby the output lines E are correspondingly designated $E_0$—$E_7$. The 0, 1, 2 and 4 columns are selected to perform logical AND operations whereby the situation $\bar{U}V$ obtains. The columns 3, 5, 6 and 7 are selected to perform logical OR operations whereby the situation $\bar{U}\bar{V}$ obtains. Where a logical AND operation is to be performed by a column, the C input to a column is a binary "1." Where a logical OR operation is to be performed, the C input to a column is a binary "0."

In FIG. 7, the symbol T within a cell indicates that a TRUE CARE is called for, i.e., the condition XY. The symbol C indicates that a COMPLEMENT CARE is called for, i.e., the condition $X\bar{Y}$. The symbol R indicates that a transfer is to take place as shown in FIG. 4, i.e., the condition $\bar{X}Y$ and a blank indicates that a pass operation is to take place, as shown in FIG. 3, i.e., the condition $\bar{X}\bar{Y}$.

In considering the operation of the arrangement shown in FIG. 7, it is readily appreciated that the output on line $E_0$ is equal to $A_2 \cdot A_3 \cdot A_6$: that the output on line $E_1$ is equal to $A_1 \cdot A_3 \cdot A_5 \cdot \bar{A}_8$: and that the output on line $E_2$ is equal to $A_3 \cdot A_4 \cdot A_5 \cdot A_6$. Column 3 calls for a logical OR operation. It is realized that a pass operation, i.e., condition $\bar{X}\bar{Y}$, permits a passing through of the outputs through the right horizontally and downward vertically. Thus, in column 4, $A_1$, $\bar{A}_2$ and $A_3$ are ANDed at cells 14, 24 and 34. The latter combination is then transferred by cell 44 to logical OR cell 45 in column 5. $A_2$, which occurs as a single input to OR cell 23, is passed through cell 33 and then transferred by transfer cell 43 to cell 44. Since cell 44 is also a transfer cell, the input $A_2$ is transferred by cell 44 as an input to logical AND cell 54 where it is ANDed with $A_5$ and $\bar{A}_6$ in AND cells 54 and 64. This AND function, i.e., $A_2\ A_5\ \bar{A}_6$, is transferred by transfer cell 74 to cell 75. Input $A_4$ in cell 42 is transferred by transfer cell 43 to cell 53 from whence it is passed through cell 63 into cell 73 where it is logically OR'd with input $A_7$. The OR combination of $(A_4+A_7)$ is then transferred by cell 83 to cell 84 from which it is passed to logical OR cell 85. Thus, the output on line $E_5$ is equal to $(A_1 \cdot \bar{A}_2 \cdot A_3) + (A_2 \cdot A_5 \cdot \bar{A}_6) + A_4 + A_7$.

It is appreciated that with the conditions imposed in columns 3, 4 and 5, there is generated a multilevel function using the TRANSFER condition in accordance with the principles of the invention.

In FIG. 8A, there is shown a grid similar to that of FIG. 7 but which illustrates the combined use of logical and arithmetic selection of the invention as well as the capability to program select a threshold. As seen in FIG. 8A, the 0, 1, 4 and 5 columns are chosen to perform arithmetic operations, i.e., condition U. Columns 0, 1 and 5 are chosen to add a binary "0" respectively, i.e., condition $\bar{V}$, and column 4 is chosen to add a binary "1," i.e., condition V. Columns 2, 6 and 7 are selected to perform logical OR operations, i.e., condition $\bar{U}\bar{V}$, and column 3 is selected to perform a logical AND operation, i.e., condition $\bar{U}V$. In the setting forth of the columnar conditions in the grid of FIG. 8, it is to be noted that column 0 has a binary weighting of "1," column 1 has a binary weighting of "2" and column 2 has a binary weighting of "4," in accordance with binary notation. However, it is seen that column 2 is controlled not for an arithmetic operation but for a logical OR operation. Column 2, in this situation, is advantageously programmed as a logical OR operation because with seven A inputs, the maximum count in a column could only be seven whereby only a single carry would be available in column 2 at the row inputs of cells 52, 62, 72 and 82. By selecting this column as a logical function, the row inputs are made available to column 3 for the generation of an independent function without being in any way involved with carries as would occur with an arithmetically controlled column as is further explained hereinbelow.

In considering the operation of the grid shown in FIG. 8A, it is to be realized that the C input in an arithmetic operation where a binary "0" is to be added is binary "0" and where a binary "1" is to be added, a binary "1." As explained previously in connection with the grid of FIG. 7, a binary "0" is inserted as the C input in a column calling for logical OR operation and a binary "1" is inserted in a column calling for a logical AND operation.

Figure 8B:
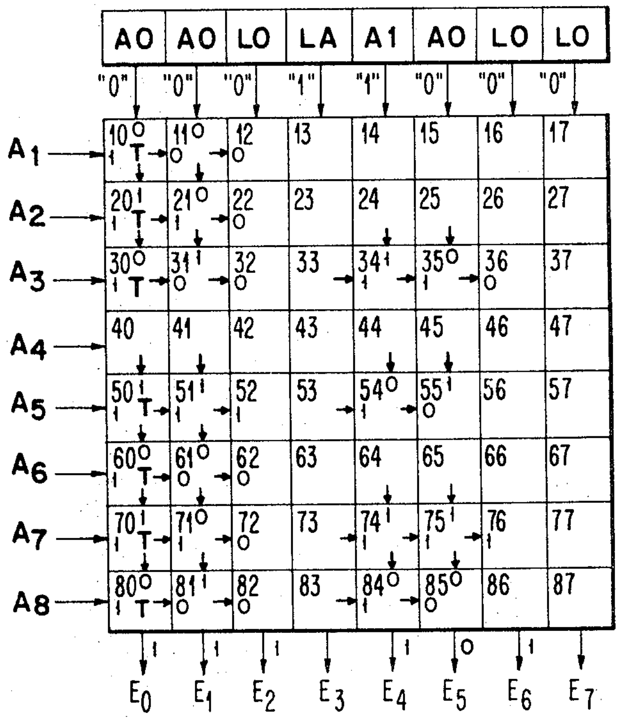

The operation of the grid of FIG. 8A is readily followed with reference to FIG. 8B. Let it be assumed that all of the A inputs are all binary "1's." Thus, into cell 10, the C input is a binary "0" and the A input is a binary "1" whereby a binary "1" goes to cell 20 with no carry to cell 11. The $A_2$ binary "1" input and the binary "1" input from cell 10 are added in cell 20 to result in a binary "0" going to cell 30 and a binary "1" carry going to cell 21. In cell 30 the binary "0" from cell 20 and the $A_3$ binary "1" input result in a binary "1" going to cell 40 where the one is passed through to appear as an input to cell 50. The binary "1" $A_5$ input is added in cell 50 to the binary "1" output from cell 30 whereby a "0" is applied to cell 60 and a binary "1" is carried to cell 51. In cell 60, the binary "1" $A_6$ input and the "0" output from cell 50 are added to provide a binary "1" carry to cell 70. In cell 70, the binary "1" $A_7$ input and the one output from cell 60 are added to provide a binary one carry to cell 71. In cell 80, the binary "0" output from cell 70 and the binary "1" $A_8$ output are added to provide a binary "1" output on line $E_0$.

In column 1, there are added the C binary "0" output and the "0" output from cell 10 whereby a "0" is applied as an input to cell 21. In cell 21, the binary "1" carry from cell 20 and the "0" output from cell 11 are added to provide binary "1" input to cell 31. In cell 31, the binary "1" output from cell 21 and the "0" output from cell 30 are added to provide a binary "1" input to cell 41, the binary "1" being passed through cell 41 to appear as an input to cell 51. In cell 51, the binary "1" carry from cell 50 and the binary "1" output from cell 31 are added to provide a binary "1" carry to cell 52 and a "0" input to cell 61. In cell 61, the "0" output from cell 51 and the "0" output from cell 60 are added to provide a "0" input to cell 71. In cell 71, the binary "1" carry from cell 70 and the "0" output from cell 61 are added to provide a binary "1" input to cell 81. Thus, a binary "1" appears on output line $E_1$.

In column 2, binary zeros appear on the B inputs to cells 12, 22 and 32. A binary "1" appears on the B input to cell 52 and binary zeros appear on the B inputs to cells 62, 72 and 82 whereby, with column 2 being caused to execute an OR operation, a binary "1" appears on output line $E_2$. It can now be appreciated how the selection of column 2 to perform an OR operation presents the advantage in that the maximum count could only be seven whereby only a single carry would be available at the row input of cells 52, 62, 72 or 82 and that, by selecting this column as a logical function, the row inputs $A_{118}$ are made available to column 3 for the generation of an independent function. The operation of columns 0, 1 and 2 in the grid of FIG. 8 leads to the following expression: $E_0(1), E_1(2), E_2(4) = \Sigma(A_1\ A_2\ A_3\ A_5\ A_6\ A_7\ A_8)$.

In the function generated in columns 3—6 of FIG. 8A, there is illustrated the combined use of the logical and arithmetical selection as well as the ability to program select a threshold. Thus, in column 3 which calls for a logical AND operation, $A_1$ and $\bar{A}_2$ are ANDed together in logical AND cells 13 and 23 and transferred through transfer cell 33 to cell 34. Input $A_3$ is transferred through transfer cell 33 to be ANDed with input $A_4$. In logical AND cell 43, the $A_3 \cdot A_4$ combination is transferred through transfer cell 53 to cell 54. Input $A_5$ is transferred through transfer cell 53 to be ANDed in logical AND cell 63 with input $A_6$, the AND combination of $A_5$ and $A_6$ being transferred through transfer cell 73 to cell 74. The $A_8$ input appears on the B input to cell 84. As has been mentioned immediately hereinabove, the purpose of this function is to produce a signal at a threshold count, specifically a threshold count of three out of four inputs. To effect this, the total of a binary "1" is added in columns 4 and 5, i.e., a binary "1" is added to column 4 and a binary "0" is added to column 5.

It is seen that columns 4, 5 and 6 with columns 4 and 5 calling for arithmetic operations, and column 6 calling for logical OR operation, result in the same weightings as correspondingly resulted in the cases of columns 0, 1 and 2, i.e., the binary values of "1," "2" and "4" respectively. By adding a binary "1" total to columns 4 and 5, a threshold signal is generated at the output of column 6 when three or more of the row inputs are satisfied.

In considering the operation of rows 4, 5 and 6 in FIG. 8A, with the addition of a binary "1" input to cell 34 and a binary "1" $A_1 \cdot \bar{A}_2$ input, the output from cell 34 to cell 54 is a binary "0" with a binary "1" carry to cell 35. In cell 54, the binary one input, i.e., $A_3 \cdot A_4$, is added with the binary "0" output from cell 34 to provide a binary "1" input to cell 74. In cell 74, the binary "1" output from cell 54 and the binary "1" input $A_5 A_6$ are added to provide a "0" to cell 84 and a binary "1" carry to cell 75. In cell 84, the binary "0" output of cell 74 and the binary "1" input $A_8$ provide a binary "1" output on line $E_4$. In column 5, the binary "1" carry from cell 34 and the binary "0" C input are added in cell 35 to provide a binary "1" to cell 55 and a binary "0" to cell 36. In cell 55, the binary "1" output from cell 35 and the binary "0" input from cell 54 provide a binary "1" to cell 75. In cell 75, the binary "1" output from cell 55 and the binary "1" carry from cell 74 provide a binary "0" output to cell 85 and a binary "1" carry to cell 76. In cell 85, the binary "0" output from cell 75 and the binary "0" carry from cell 84 provide a binary "0" output on line $E_5$.

In column $E_6$, the binary "1" appears in cell 76 as a result of the arithmetic operation in columns 4 and 5, and a binary "" appears on the output line $E_6$. Thus, with the addition of the constant binary "1" to the sum of the inputs to column 4 and 5 and with three or more of the row inputs being satisfied, a threshold signal at the binary "4" weighted output, i.e., the output of column 6, appears when three or more of the row inputs are satisfied.

The arrangement according to the invention may also be used, for example, for matching a measurement vector against binary or ternary reference vectors and the formation of mismatch counts, i.e., the computation of binary or ternary dot products. In such application, the measurement vector would be connected to the inputs A of the array and for each reference a number of columns sufficient to accommodate the largest permissible mismatch count, are programmed for arithmetic operation. The "Don't Care" conditions in the reference vector are programmed by making the corresponding rows "Pass" conditions, and the "black/white" defining bits are programmed using the "true/complement" inputs to the first of the arithmetic columns. The final mismatch counts are taken from the bottoms of the corresponding arithmetic columns.

Figure 9:
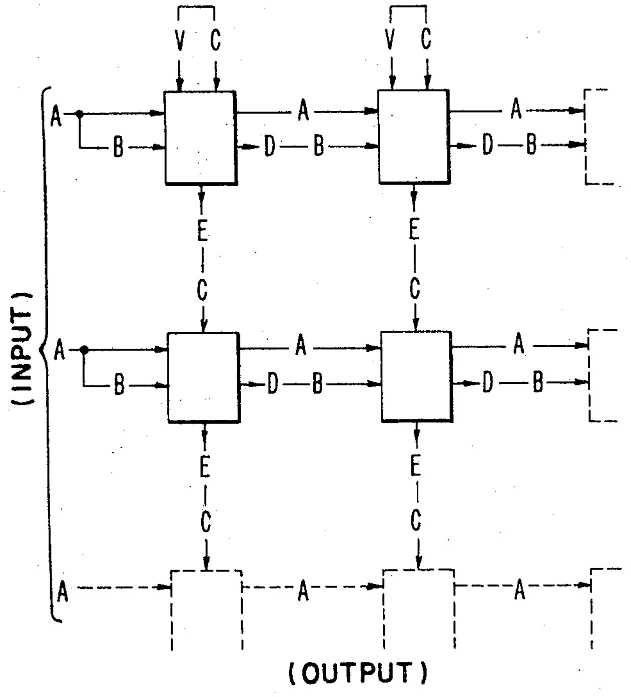
FIG. 9 is a diagram depicting how a plurality of arrays can be combined.

An array constructed in accordance with the principles of the invention is designed such that it can be extended both by rows and columns as shown in FIG. 9 wherein each block represents a discrete grid. The V input may be connected to the C input as shown when external logic control is not used.

Figure 10:
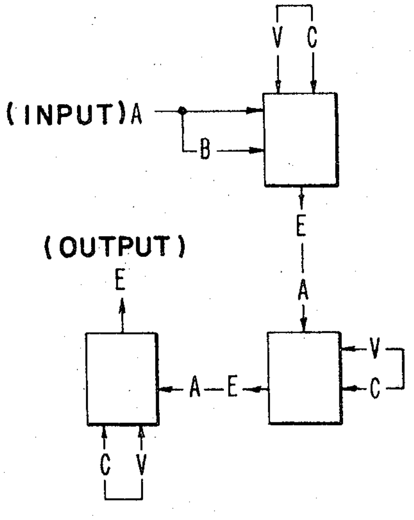
FIG. 10 is a depiction showing how a multilevel array can be constructed according to the invention.

FIG. 10 shows how, in accordance with the invention, multilevel arrays can be built up by connecting the output E of an array or group of arrays to the input A of a second array or group of arrays.

It will be apparent that the regular structure of the array is well suited to implementation in integrated circuit technologies.

While the invention has been particularly shown and described with reference to a preferred embodiment thereof, it will be understood by those skilled in the art that the foregoing and other changes in form and details may be made therein without departing from the spirit and scope of the invention.

What we claim is:

1. A programmable logic and arithmetic manipulating arrangement comprising:

a rectangular array of cells which define N+1columns of said cells and M rows of said cells, the output D of each cell in a row being applied as an input B to the next cell to the right in said row, the output E of each cell in a column being applied as an input C to the next lower cell in said column;

a first storage stage U and a second storage stage V connected to each of said columns for determining the operation to be performed by each column, said U and V stages each being capable of assuming opposite binary states;

a third storage stage X and a fourth storage stage Y connected to each of said cells for determining the operations to be performed by each of said cells in accordance with the operation determined by said U and V stages, said X and Y stages each being capable of assuming opposite binary states;

means for applying respective $B_1$—$B_M$ inputs to each of the cells in the leftmost column of said array;

means for applying $A_1$—$A_M$ respective inputs to the cells comprising each row in said array;

means for applying respective $C_0$—$C_N$ inputs to each of the cells in the topmost row of said array;

said array being operative to produce respective $D_1$—$D_M$ outputs from the cells comprising the rightmost column of said array and $E_0$—$E_N$ respective outputs from the cells comprising the lowermost row of said array;

said cells each comprising a circuit for producing the following D and E outputs:

$$D=\bar{X}(YC+\bar{Y}B)+X[\bar{U}A+UC(YB+\bar{Y}\bar{B})]$$

$$E=\bar{X}(YB+\bar{Y}C)+X\{[(\bar{U}\bar{V}+\bar{U}C+U\bar{C})(YB+\bar{Y}\bar{B})]+[UC(\bar{Y}B+Y\bar{B})]+[\bar{U}\bar{V}C]\}$$

2. A programmable logic and arithmetic manipulating arrangement comprising:

a rectangular array of cells which define N+1 columns of said cells and M rows of said cells, the output D of each cell in a row being applied as an input B to the next cell to the right in said row, the output E of each cell in a column being applied as an input C to the next lower cell in said column;

a first storage stage U and a second storage stage V connected to each of said columns for determining the operation to be performed by each column, said U and V stages each being capable of assuming opposite binary states;

a third storage stage X and a fourth storage stage Y connected to each of said cells for determining the operations to be performed by each of said cells in accordance with the operation determined by said U and V stages, said X and Y stages each being capable of assuming opposite binary states;

means for applying respective $B_1$—$B_M$ inputs to each of the cells in the leftmost column of said array;

means for applying $A_1$—$A_M$ respective inputs to the cells comprising each row in said array;

means for applying respective $C_0$—$C_N$ inputs to each of the cells in the topmost row of said array;

said array being operative to produce respective $D_1$—$D_M$ outputs from the cells comprising the rightmost column of said array and $E_0$—$E_N$ respective outputs from the cells comprising the lowermost row of said array;

said cells each comprising a circuit for producing the following D and E outputs:

$$D=\bar{X}(YC+\bar{Y}B)+X[\bar{U}A+UC(YB+\bar{Y}\bar{B})]$$

$$E=\bar{X}(YB+\bar{Y}C)+X\{[(\bar{U}\bar{V}+\bar{U}C+U\bar{C})(YB+\bar{Y}\bar{B})]+[UC(\bar{Y}B+Y\bar{B})]+[\bar{U}\bar{V}C]\}$$

means for connecting the respective V stages, the U stages and the X and Y stages in series arrangement to enable said last named arrangement to be operated as a shift register in the column; and means for applying an input to each of said columns for respectively shifting the contents of said V, U, X and Y stages in the columns.

3. A programmable logic and arithmetic manipulating arrangement comprising:

a rectangular array of cells which define N+1 columns of said cells and M rows of said cells, the output D of each cell in a row being applied as an input B to the next cell to the right in said row, the output E of each cell in a column being applied as an input C to the next lower cell in said column;

a first storage stage U and a second storage stage V connected to each of said columns for determining the operation to be performed by each column, said U and V stages each being capable of assuming opposite binary states, one binary state of said U stage resulting in an arithmetic operation for a column, the opposite binary state of said U stage resulting in a logical operation for said column, one binary state of said V stage resulting in the addition of a binary "1" to a column when the state of said U stage results in an arithmetic operation, the opposite binary state of said V stage in said arithmetic operation resulting in the addition of a binary "0" to a column, one binary state of said V stage resulting in an AND operation when the state of said U stage results in a logical operation, the opposite binary state of said V stage during said logical operation resulting in an OR operation;

a third storage stage X and a fourth storage stage Y connected to each of said cells for determining the operations to be performed by each of said cells in accordance with the operation determined by said U and V stages, said X and Y stages each being capable of assuming opposite binary states;

means for applying respective $B_1$—$B_M$ inputs to each of the cells in the leftmost column of said array;

means for applying $A_1$—$A_M$ respective inputs to the cells comprising each row in said array;

means for applying respective $C_0$—$C_N$ inputs to each of the cells in the topmost row of said array;

said array being operative to produce respective $D_1$—$D_M$ outputs from the cells comprising the rightmost column of said array and $E_0$—$E_N$ respective outputs from the cells comprising the lowermost row of said array;

said cells each comprising a circuit for producing the following D and E outputs:

$$D=\overline{X}(YC+\overline{Y}B)+X[\overline{U}A+UC(YB+\overline{Y}\overline{B})]$$

$$E=\overline{X}(YB+\overline{Y}C)+X\{[(\overline{U}\overline{V}+\overline{U}C+U\overline{C})(YB+\overline{Y}\overline{B})]+[UC(\overline{Y}B+Y\overline{B})]+[\overline{U}\overline{V}C]\}$$

4. A programmable logic and arithmetic manipulating arrangement comprising:

a rectangular array of cells which define N+1 columns of said cells and M rows of said cells, the output D of each cell in a row being applied as an input B to the next cell to the right in said row, the output E of each cell in a column being applied as an input C to the next lower cell in said column;

a first storage stage U and a second storage stage V connected to each of said columns for determining the operation to be performed by each column, said U and V stages each being capable of assuming opposite binary states;

a third storage stage X and a fourth storage stage Y connected to each of said cells for determining the operations to be performed by each of said cells in accordance with the operation determined by said U and V stages, said X and Y stages each being capable of assuming opposite binary states, one binary state of said X stage resulting in a care operation in a cell controlled thereby, the opposite binary state of said X stage resulting in a don't care operation in said cell, one binary state of said Y stage when the state of its corresponding X stage results in a care operation causing the selection of the true value of the B input to said cell, the opposite binary state of said Y stage during said care operation causing the selection of the complement of the B input to said cell, one binary state of said Y stage when the state of its corresponding X stage results in a don't care operation causing a transfer operation in said cell, the opposite binary state of said Y stage during said don't care operation causing a pass operation in said cell;

means for applying respective $B_1$—$B_M$ inputs to each of the cells in the leftmost column of said array;

means for applying $A_1$—$A_M$ respective inputs to the cells comprising each row in said array;

means for applying respective $C_0$—$C_N$ inputs to each of the cells in the topmost row of said array;

said array being operative to produce respective $D_1$—$D_M$ outputs from the cells comprising the rightmost column of said array and $E_0$—$E_N$ respective outputs from the cells comprising the lowermost row of said array;

said cells each comprising a circuit for producing the following D and E outputs:

$$D=\overline{X}(YC+\overline{Y}B)+X[\overline{U}A+UC(YB+\overline{Y}\overline{B})]$$

$$E=\overline{X}(YB+\overline{Y}C)+X\{[(\overline{U}\overline{V}+\overline{U}C+U\overline{C})(YB+\overline{Y}\overline{B})]+[UC(\overline{Y}B+Y\overline{B})]+[\overline{U}\overline{V}C]\}$$

5. A programmable logic and arithmetic manipulating arrangement comprising:

a rectangular array of cells which define N+1 columns of said cells and M rows of said cells, the output D of each cell in a row being applied as an input B to the next cell to the right in said row, the output E of each cell in a column being applied as an input C to the next lower cell in said column;

a first storage stage U and a second storage stage V connected to each of said columns for determining the operation to be performed by each column, said U and V stages each being capable of assuming opposite binary states, one binary state of said U stage resulting in an arithmetic operation for a column, the opposite binary state of said U stage resulting in a logic operation for said column, one binary state of said V stage resulting in the addition of a binary "1" to a column when the state of said U stage results in an arithmetic operation, the opposite binary state of said V stage in said arithmetic operation resulting in the addition of a binary "0" to a column, one binary state of said V stage resulting in an AND operation when the state of said U stage results in a logical operation, the opposite binary state of said V stage during said logical operation resulting in an OR operation;

a third storage stage X and a fourth storage stage Y connected to each of said cells for determining the operations to be performed by each of said cells in accordance with the operation determined by said U and V stages, said X and Y stages each being capable of assuming opposite binary states, one binary state of said X stage resulting in a care operation in a cell controlled thereby, the opposite binary state of said X stage resulting in a don't care operation in said cell, one binary state of said Y stage when the state of its corresponding X stage results in a care operation causing the selection of the true value of the B input to said cell, the opposite binary state of said Y stage during said care operation causing the selection of the complement of the B input to said cell, one binary state of said Y stage when the state of its corresponding X stage results in a don't care operation causing a transfer operation in said cell, the opposite binary state of said Y stage during said don't care operation causing a pass operation in said cell;

means for applying respective $B_1$—$B_M$ inputs to each of the cells in the leftmost column of said array;

means for applying $A_1$—$A_M$ respective inputs to the cells comprising each row in said array;

means for applying respective $C_0$—$D_N$ inputs to each of the cells in the topmost row of said array;

said array being operative to produce respective $D_1$—$D_M$ outputs from the cells comprising the rightmost column of said array and $E_0$—$E_N$ respective outputs from the cells comprising the lowermost row of said array;

said cells each comprising a circuit for producing the following D and E outputs:

$$D=\overline{X}(YC+\overline{Y}B)+X[\overline{U}A+UC(YB+\overline{Y}\overline{B})]$$

$$E=\overline{X}(YB+\overline{Y}C)+X\{[(\overline{U}\overline{V}+\overline{U}C+U\overline{C})(YB+\overline{Y}\overline{B})]+[UC(\overline{Y}B+Y\overline{B})]+[\overline{U}\overline{V}C]\}$$

6. An arrangement as defined in claim 5 wherein there are included a plurality of said arrays, the $D_1$—$D_M$ outputs of an array being the $B_1$—$B_M$ inputs to an array horizontally adjacent to said array, the $E_0$—$E_N$ outputs of an array being the $C_0$—$C_N$ inputs to an array horizontally adjacent to said array.

7. An arrangement as defined in claim 5 wherein said A and B inputs are tied together and said C and V inputs are tied together.

8. An arrangement as defined in claim 5 wherein there are included a plurality of said arrays, the $E_0$—$E_N$ outputs of an array being the $A_1$—$A_M$ inputs to another array.

PO-1050
(5/69)

UNITED STATES PATENT OFFICE
CERTIFICATE OF CORRECTION

Patent No. 3,584,205 Dated June 8, 1971

Inventor(s) Davey Malaby and Michael A. Wesley

It is certified that error appears in the above-identified patent and that said Letters Patent are hereby corrected as shown below:

Col. 10, line 50 Correct "$C_0$-$D_N$" to -- $C_0$-$C_N$ --

Signed and sealed this 10th day of October 1972.

(SEAL)
Attest:

EDWARD M.FLETCHER,JR.
Attesting Officer

ROBERT GOTTSCHALK
Commissioner of Patents